Nov. 17, 1942.   C. E. BROWN   2,302,489
OIL RECLAIMING APPARATUS
Filed July 13, 1939   2 Sheets-Sheet 1

INVENTOR
Cleo E. Brown.
BY Arthur E. Brown
ATTORNEY

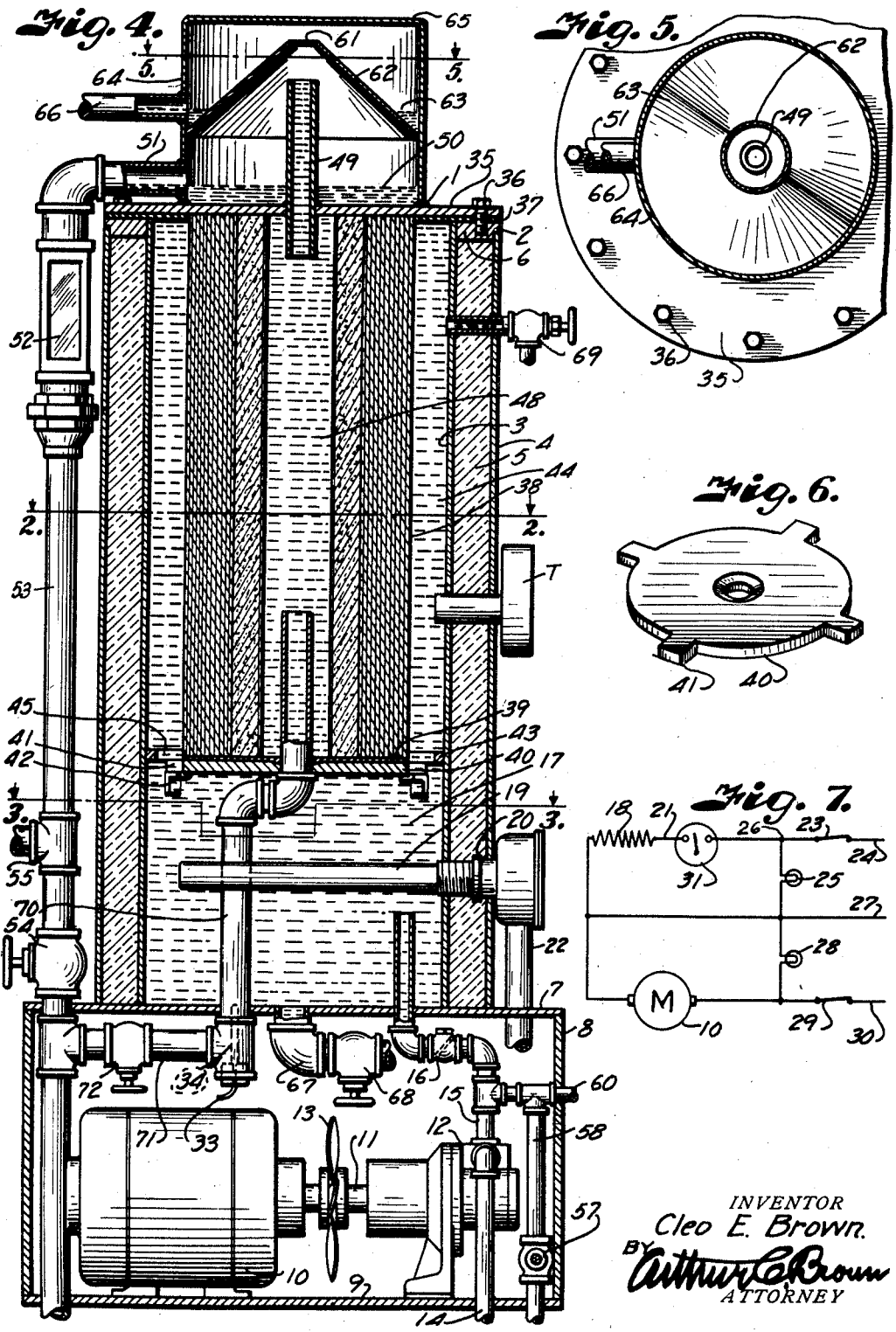

Patented Nov. 17, 1942

2,302,489

UNITED STATES PATENT OFFICE 2,302,489

OIL RECLAIMING APPARATUS

Cleo E. Brown, Harrisonville, Mo.

Application July 13, 1939, Serial No. 284,241

4 Claims. (Cl. 196—16)

This invention relates to oil reclaiming apparatus, and more particularly to apparatus for reclaiming or purifying lubricating oils contaminated with light non-lubricating hydrocarbon fractions, water, acids, solid matter, discoloring constituents and the like resulting, for example, for use in internal combustion engines, the principal objects of the present invention being to provide an efficient, convenient and economical apparatus for such purposes.

Other important objects of the present invention are to provide an apparatus, which may be easily applied to conventional and existing oil reservoirs as employed, for example, in connection with internal combustion engines; to provide for carrying out either continuous or batch oil reclaiming operations; to provide controlled heat for the oil as it is being reclaimed for aiding in purifying the oil; to provide uniform temperatures for the oil during its reclamation as by causing turbulent flow thereof during heating of the oil; to provide for preventing deterioration in effect of the heating element of the apparatus, as by flushing the element with oil that is being reclaimed; to provide for conveniently extracting the moisture and lighter fractions of the oil without the requirement of heat and power additional to that for filtering the oil; to provide for reversing flow through the apparatus to clean the same including the filtering element; and to provide improved elements and arrangements of them in the structure of an apparatus of this character.

In accomplishing these and other objects of the present invention, I have provided improved details of structure, the preferred form of which is illustrated in the accompanying drawings, wherein:

Fig. 4 is a substantially central vertical section through an oil reclaimer embodying the features of the present invention.

Fig. 5 is a fragmentary horizontal cross-section on the line 5—5, Fig. 4.

Fig. 6 is a detail perspective view of the supporting plate for the purifying filter element.

Fig. 7 is a diagrammatic view of a wiring system for my improved oil reclaiming apparatus.

Figure 1:
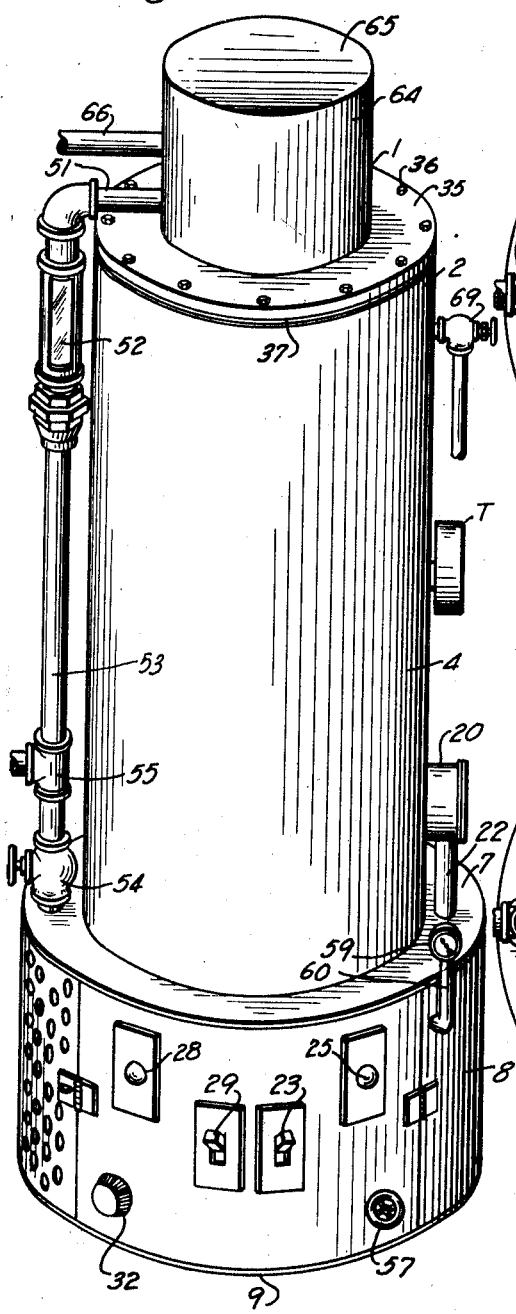
Fig. 1 is a perspective view of an oil reclaimer embodying the features of the present invention.
Figure 2:
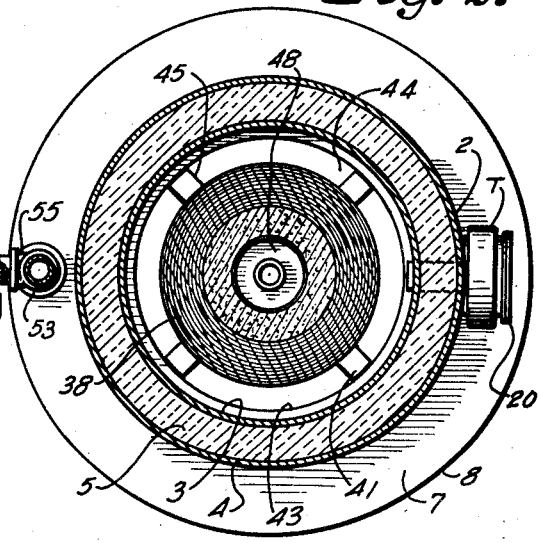
Fig. 2 is a horizontal cross-section on the line 2—2, Fig. 4.
Figure 3:
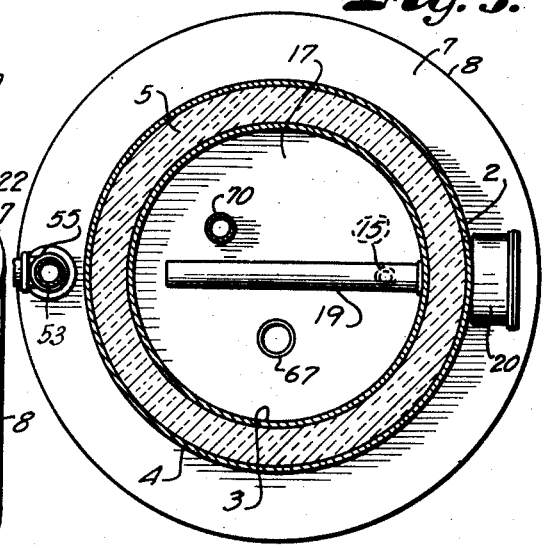
Fig. 3 is a horizontal cross-section on the line 3—3, Fig. 4.

Referring more in detail to the drawings:

I generally designates an oil reclaiming apparatus embodying the features of the present invention, which preferably includes a receptacle 2 comprising spaced concentrically arranged inner and outer walls 3 and 4 separated by insulating material 5. The upper ends of the receptacle walls are preferably connected by an annular retaining ring 6 which may be welded or otherwise secured to the walls in such a manner as to seal the insulating material in the space between the walls. The lower portions of the walls and the insulating material preferably rest on the top wall 7 of a support 8, the support being in the form of a housing, the lower end of which is closed by a bottom base wall 9.

The housing 8 encloses a preferably electric motor 10 which is mounted on the bottom wall of the housing and has a shaft 11 drivingly engaged with a pump 12, preferably of rotary type, the shaft 11 being provided with a ventilating fan 13 for cooling the interior of the housing and especially the pump. The housing is also preferably provided with perforate doors to aid in maintaining the interior of the housing in a cool state.

The pump 12 has a suction line 14 which may be connected to a source of supply of oil to be purified, for example the lubricating oil reservoir of an internal combustion engine, not shown, and is also provided with a discharge line 15 having a check valve 16, the line leading through the top wall 7 of the housing 8 into a sludge sump or chamber 17 in the lower interior end of the receptacle.

A heating element 18, Fig. 7, enclosed in a heat conducting cover 19, Fig. 4, is mounted in the receptacle by a fitting 20, the heating element being arranged in the path of oil as it is being delivered into the receptacle by the pump. The arrangement shown causes turbulence in the flow of oil into the receptacle and thus assures an even distribution of heat throughout the oil. The turbulence also flushes the cover of the heating element, thus maintaining it clear of carbon and like deposits, which ordinarily would adversely affect the effective action of the element.

In order to energize the heating element, it is provided with a conductor 21, Fig. 7, leading through a conduit 22, Fig. 4, to a switch 23, Figs. 1 and 7, which may be connected to a source of power 24, such as a conventional electric lead-in. A pilot light 25 is also preferably provided in a circuit 26, Fig. 7, arranged in parallel with the heating element and connected to a return wire 27 as is a motor pilot light 28, the motor pilot light being arranged in parallel circuit with the motor and a switch 29, Figs. 1 and 7, therefor. A lead-in 30 furnishes the source of power for the motor.

A thermostatic switch 31, which may be adjustably set by a control 32 on the housing wall 8, is electrically connected, as by a conductor 33, with a control element 34 exposed to oil in the receptacle.

In order to confine the oil in the receptacle, it is provided with a top wall 35 secured to the ring 6 by fastening devices 36 with a gasket 37 interposed therebetween.

Mounted in the receptacle is an oil permeable purifying element 38, the principal requisite of which is that it be capable of removing acids, non-lubricating solids and the like from oil passing therethrough. Suitable elements having filtering and like qualities suitable for the purpose of the purifying element 38 are available.

The purifying element is preferably mounted on a gasket 39 supported by a plate 40, Fig. 6, comprising a body and radially extending fingers 41 for seating on inwardly extending flanges of spaced angle clips 42 which are aligned horizontally and secured, as by welding or the like, to the inner face of the inner wall of the receptacle. A guide ring 43 is preferably secured to the lower end of the purifying element for facilitating application of the purifying element to its seat on the angle clips.

The purifying element is preferably of less outer diameter than the inner diameter of the receptacle to provide a channel 44 between the receptacle and purifying element, the guide ring 43 having passages 45 therethrough to allow transfer of oil from the chamber 17 to the channel 44. The purifying element is also provided with an inner, preferably concentrically arranged, channel 48 for receiving purified oil permeating the purifying element and passing through the same in response to pressure applied on the oil by the pump 12.

As a matter of practice, the pump is maintained at a pressure sufficient to force the oil through the filtering element and, depending on the condition of the purifying element, may be maintained, for example, at a pressure of approximately from one-half (½) to twenty-five (25) pounds per square inch. Maintenance of the pump at the desired pressure is preferably determined by observing the quantity and quality of flow of the purified oil from the channel 48 of the element.

The oil flows under pressure from the channel through an outlet pipe 49 into a clean oil sump 50, or the like, at the top of the receptacle whence it is discharged by a fitting 51 through a sight glass 52 and by the fitting 53 back to the reservoir under control of a valve 54 for recirculation, if desired, through the purifying element. As an alternative the purified oil may be by-passed through the fitting 55 for suitable disposal under control of the valve 54.

Depending on the condition of the oil as viewed through the sight glass, more or less pressure by the pump may be applied to the oil in the receptacle by adjusting the valve 57 in a by-pass line 58 leading from the pump discharge line 15 to the oil reservoir. The by-pass line 58 is also preferably provided with a pressure gauge 59 connected therewith by a conduit 60 for observing what pressures are applied to the oil in its treatment.

The heating element, which is preferably maintained at a temperature, as observed by an oil thermometer T, sufficient to convert moisture and lighter hydrocarbon fractions of the oil to vapor phase, within a range for example, of approximately from 215° F. to 250° F., acts on the oil at its outlet from the inner channel of the purifying element in such a manner as to maintain the moisture and light fractions in vapor phase to cause them to rise while the liquid, lubricating constituents of the oil fall back into the sump 50.

The vapor phase constituents pass through an opening 61 in a preferably conical baffle 62 which forms the bottom wall of a separating chamber 63 having side walls 64 and a top wall 65. Since the receptacle is insulated, atmospheric temperatures maintain the separating chamber below the temperature in the receptacle, the separating chamber thus acting as a condenser for re-converting the vapor phase constituents to liquid phase, after which they are collected in the separating chamber and withdrawn through the outlet 66 for suitable disposal.

Should it be desired to remove oil from the receptacle while the pump is at rest, a drain 67 is provided in the bottom of the receptacle which is controlled by a valve 68. Removal of oil from the chamber 17 and channel 44 of the receptacle creates a vacuum which draws oil in the channel 48 through the purifying element to flush and clean the same, the vacuum being broken, when desired, by opening a valve 69 leading from the channel 44 to atmosphere.

The purified oil in the channel 48 may, if desired, be salvaged by providing a drain pipe 70 in the channel, the pipe 70 being mounted in an aperture in the supporting plate 40 and being provided with a fitting 71 connecting with the clean oil discharge line 53 under control of a valve 72.

The operation of an oil reclaiming apparatus constructed as described is as follows:

The apparatus may be suitably connected with a supply of oil to be reclaimed by applying the suction line 14 and by-pass line 58 to the supply. The motor and heating element switches are then actuated to energize their controlled devices, whereupon oil is drawn from the supply and forced into the receptacle chamber 17, the oil passing over the heating element to be heated and agitated during such flow to cause a uniform heating of all the oil. The oil then passes beyond the supporting plate for the purifying element into the channel 44 surrounding the purifying element and is forced through the element into the channel 48, the oil being rid of non-lubricating solid matter and acids during such passage.

The heating element converts moisture and lighter hydro-carbon constituents of the oil to vapor phase and while the clean oil passes through the outlet 49 and flows back into the clean oil sump 50, the vapor phase constituents pass through the separating chamber baffle and are converted back to liquid form for withdrawal from the separating chamber and suitable disposal made of them.

The clean oil flows from the sump 50 through the fitting 51 and sight glass back to the reservoir for recirculation or is by-passed to another suitable receptacle.

As the circulation and purification of oil continues, the purifying element becomes contaminated and more pressure is required to force the oil therethrough. The quality and quantity of flow of oil being observed through the sight glass, regulation of pressure may be effected by manipulation of the valve 57 on the pump discharge by-pass line to effectively control flow of oil during the reclamation operations.

Due to the fact that the thermostatic element 34 is exposed to the uniformly heated oil in the chamber 17, control of the heating element within predetermined limits may be efficiently maintained.

The dirty and clean oil may be independently and/or simultaneously drained from the receptacle and drainage flow is effectively regulated by the valves provided therefor.

The fan on the motor shaft and the perforate motor housing aid in preventing overheating of the driving parts of the system.

It is apparent, therefore, that a convenient, efficient and economical oil reclaiming apparatus has been provided by the present invention.

What I claim and desire to secure by Letters Patent is:

1. In an oil reclaiming apparatus of the character described, a receptacle having an inlet at its lower end and an outlet at its upper end, means for drawing oil to be reclaimed from a source of supply and passing the oil to the receptacle under pressure, and permeable purifying means for purifying said oil mounted in the receptacle between the inlet and outlet thereof, said permeable purifying means being arranged concentrically in spaced relation to the receptacle to form a channel therebetween communicating with the inlet and having a channel spaced from the first named channel communicating with the outlet.

2. In an oil reclaiming apparatus of the character described, a receptacle having an inlet, means for drawing oil to be reclaimed from a source of supply and passing the oil to the receptacle under pressure, an outlet for the receptacle, permeable purifying means for purifying said oil mounted in the receptacle, and separating the inlet and outlet, means in the receptacle on the inlet side of the purifying means for heating the oil to release moisture and lighter hydrocarbon constituents therefrom in vapor phase, and means arranged above and aligned with said outlet for separating said vapor phase constituents from said oil.

3. In an oil reclaiming apparatus of the character described, an insulated receptacle having an inlet, an outlet for said receptacle arranged at the upper end thereof, means for drawing oil to be reclaimed from a reservoir therefor and passing the oil to the receptacle under pressure, permeable purifying means for purifying said oil mounted in the receptacle between the inlet and outlet thereof, means for heating the oil to release moisture and lighter hydrocarbon constituents therefrom in vapor phase, a receiver arranged about said outlet for receiving said purified oil, an apertured baffle in the receiver for separating said vapor phase constituents from said oil, and an uninsulated tower on said receiver above the baffle and in communication with the aperture in said baffle for receiving and condensing said vapor phase constituents of the oil, said tower having a sump therein and an outlet for said condensed constituents of the oil.

4. In an oil reclaiming apparatus of the character described, a closed insulated receptacle having an inlet, means for passing oil to be reclaimed to said inlet under pressure, a closed purifying element having an interior channel mounted in the receptacle adapted to purify the oil upon passage of the oil therethrough under pressure of said oil passing means, means for heating said oil, an outlet from the interior channel of the purifying element, a tower mounted on said receptacle in surrounding relation to said outlet forming a receiver for purified oil and having an outlet to withdraw purified oil therefrom, and a baffle in said tower spaced from said outlet and having an aperture aligned with said outlet for passing volatile components of said oil produced by said heating means through said baffle, said tower having an uninsulated top for condensing said volatile components, said baffle cooperating with said tower for forming a sump for said condensed volatile components of the oil and having an outlet for withdrawing the same.

CLEO E. BROWN.